United States Patent
Siragusa (10) Patent No.: US 11,313,492 B2
(45) Date of Patent: Apr. 26, 2022

(54) SELF-CENTERING CABLE STRAP

(71) Applicant: Illinois Tool Works Inc., Glenview, IL (US)

(72) Inventor: George Siragusa, Chicago Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 116 days.

(21) Appl. No.: 15/648,636

(22) Filed: Jul. 13, 2017

(65) Prior Publication Data

US 2017/0307108 A1 Oct. 26, 2017

Related U.S. Application Data

(63) Continuation of application No. 13/382,785, filed as application No. PCT/US2010/038468 on Jun. 14, 2010, now abandoned.

(Continued)

(51) Int. Cl.
*F16L 3/233* (2006.01)
*B60R 16/02* (2006.01)
(Continued)

(52) U.S. Cl.
CPC .......... *F16L 3/233* (2013.01); *B60R 16/0215* (2013.01); *F16L 3/1075* (2013.01);
(Continued)

(58) Field of Classification Search
CPC .. B65D 63/10; F16B 45/00; F16B 2/08; F16L 3/08; F16L 3/137; F16L 3/1058; F16L 3/233; F16L 3/12; F16L 3/2332; F16L 3/2336; F16L 3/2334; F16L 3/085; F16L 33/035; F16L 3/1075; F16L 3/1033; F16L 3/105; H02G 3/32; H02G 3/30; H02G 3/26

(Continued)

(56) References Cited

U.S. PATENT DOCUMENTS 1,804,725 A * 5/1931 Walker .................. F16L 33/035
24/20 TT
2,417,269 A * 3/1947 Robertson ............... F16L 3/233
248/61

(Continued)

FOREIGN PATENT DOCUMENTS

CN 1725585 A 1/2006
EP 0709609 A1 5/1996
(Continued)

OTHER PUBLICATIONS

First Office Action from corresponding Chinese Patent Application No. 201080030578.1, dated May 2, 2013 (12 pages).

(Continued)

*Primary Examiner* — Jonathan Liu
*Assistant Examiner* — Taylor L Morris
(74) *Attorney, Agent, or Firm* — Quarles & Brady LLP (57) ABSTRACT

A self-centering cable strap centers items such as cables, wires and tubes, or bundles thereof, on a bed of the strap. A cinch strap extends from one side of the bed and abutment figures extend from a side of the bed opposite the cinch strap and project laterally and axially relative to the bed.

19 Claims, 3 Drawing Sheets

Related U.S. Application Data (60) Provisional application No. 61/223,451, filed on Jul. 7, 2009.

(51) Int. Cl.
  *F16L 3/10* (2006.01)
  *F16L 3/137* (2006.01)
  *H02G 3/00* (2006.01)
  *H02G 3/32* (2006.01)

(52) U.S. Cl.
  CPC .............. *F16L 3/137* (2013.01); *H02G 3/26* (2013.01); *H02G 3/32* (2013.01)

(58) Field of Classification Search
  USPC ............. 248/65, 67.5, 74.1–74.5, 28.1, 74.3
  See application file for complete search history.

(56) References Cited

U.S. PATENT DOCUMENTS

| | | | | |
|---|---|---|---|---|
| 3,054,585 A * | 9/1962 | Fredt | .............. | F16L 3/233 24/16 PB |
| 3,113,754 A * | 12/1963 | Jansson | .............. | F16L 3/12 248/74.3 |
| 3,421,187 A * | 1/1969 | Ryder | .............. | F16L 3/2235 403/391 |
| 3,463,427 A * | 8/1969 | Fisher | .............. | F16L 3/2332 24/16 PB |
| 3,484,905 A * | 12/1969 | Robert | .............. | B65D 63/1063 24/16 PB |
| 3,581,349 A * | 6/1971 | Verspieren | .............. | F16L 3/12 24/16 PB |
| 3,632,069 A * | 1/1972 | Thayer | .............. | F16L 3/233 248/56 |
| 3,668,744 A * | 6/1972 | Moody | .............. | F16B 2/08 403/188 |
| 3,731,347 A * | 5/1973 | Caveney | .............. | B65D 63/1072 24/16 PB |
| 3,875,619 A * | 4/1975 | Fortsch | .............. | B65D 63/1072 24/16 PB |
| 4,191,334 A * | 3/1980 | Bulanda | .............. | F16L 3/233 24/16 PB |
| 4,235,404 A * | 11/1980 | Kraus | .............. | F16L 3/233 24/16 PB |
| 4,372,011 A * | 2/1983 | Aranyos | .............. | F16L 3/233 24/16 PB |
| 4,386,752 A * | 6/1983 | Pavlak | .............. | F16L 3/127 248/73 |
| 4,389,754 A * | 6/1983 | Sohma | .............. | F16L 3/137 24/16 PB |
| 4,390,019 A * | 6/1983 | LeVeen | .............. | A61B 17/122 606/158 |
| 4,395,009 A * | 7/1983 | Bormke | .............. | H02G 3/32 174/157 |
| 4,397,435 A * | 8/1983 | Fisher | .............. | F16L 3/00 24/21 |
| 4,445,656 A * | 5/1984 | Leitch | .............. | F16L 3/1058 24/23 R |
| 4,447,934 A * | 5/1984 | Anscher | .............. | F16L 3/233 24/16 PB |
| 4,483,556 A * | 11/1984 | LiVolsi | .............. | F16L 33/035 24/16 R |
| 4,502,186 A * | 3/1985 | Clarke | .............. | F16L 33/035 24/16 PB |
| 4,547,953 A * | 10/1985 | LiVolsi | .............. | F16L 33/035 29/453 |
| 4,564,163 A * | 1/1986 | Barnett | .............. | F16L 3/12 24/16 PB |
| 4,572,466 A * | 2/1986 | Yamaguchi | .............. | F16L 3/233 24/16 PB |
| 4,632,343 A * | 12/1986 | Watanabe | .............. | F16B 2/08 24/30.5 R |
| 4,635,886 A * | 1/1987 | Santucci | .............. | F16L 3/12 24/543 |
| 4,669,688 A * | 6/1987 | Itoh | .............. | F16L 3/23 24/16 PB |
| 4,682,748 A * | 7/1987 | Freudenmann | .......... | H02G 3/32 248/73 |
| 4,700,913 A * | 10/1987 | Hirano | .............. | B60R 16/0215 24/543 |
| 4,766,651 A * | 8/1988 | Kobayashi | .......... | B60R 16/0215 24/16 PB |
| 4,779,828 A * | 10/1988 | Munch | .............. | H02G 3/32 248/74.3 |
| 4,805,856 A * | 2/1989 | Nicoli | .............. | F16L 3/233 24/16 PB |
| 4,840,345 A * | 6/1989 | Neil | .............. | F16L 3/12 24/16 PB |
| 4,875,647 A * | 10/1989 | Takagi | .............. | F16L 3/233 248/74.3 |
| 4,881,705 A * | 11/1989 | Kraus | .............. | F16L 3/08 248/74.2 |
| D305,099 S | 12/1989 | Naruse et al. | | |
| 4,925,709 A * | 5/1990 | Shmueli | .............. | A63B 9/00 428/222 |
| 4,944,475 A * | 7/1990 | Ono | .............. | F16L 3/233 24/16 PB |
| 4,958,791 A * | 9/1990 | Nakamura | .......... | B65D 33/1616 24/16 PB |
| 4,997,147 A * | 3/1991 | Velke, Sr. | .............. | F16L 3/1215 248/230.7 |
| 5,042,114 A * | 8/1991 | Parrish | .............. | F16L 3/233 24/16 PB |
| 5,042,958 A * | 8/1991 | Stenersen | .............. | F16L 1/06 248/49 |
| 5,065,562 A * | 11/1991 | Larsen | .............. | E04D 3/08 52/772 |
| 5,113,717 A * | 5/1992 | Plamper | .............. | F16B 7/0433 248/68.1 |
| 5,131,613 A * | 7/1992 | Kamiya | .............. | F16L 3/233 24/16 PB |
| 5,230,489 A * | 7/1993 | White | .............. | F16L 3/233 24/16 PB |
| 5,267,967 A * | 12/1993 | Schneider | .............. | A61M 25/02 128/DIG. 6 |
| 5,332,179 A * | 7/1994 | Kuffel | .............. | F16L 3/233 248/74.3 |
| 5,363,539 A * | 11/1994 | Tisol | .............. | F16L 3/2235 24/339 |
| 5,367,750 A * | 11/1994 | Ward | .............. | F16L 3/12 24/16 PB |
| 5,368,261 A * | 11/1994 | Caveney | .............. | F16L 3/233 248/73 |
| 5,385,373 A * | 1/1995 | Love | .............. | F16B 41/007 24/16 PB |
| 5,535,969 A * | 7/1996 | Duffy, Jr. | .............. | F16L 3/227 24/487 |
| 5,538,208 A * | 7/1996 | Cordes | .............. | F16L 3/233 248/68.1 |
| 5,568,906 A * | 10/1996 | Hahn | .............. | F16L 3/12 248/229.13 |
| 5,597,280 A * | 1/1997 | Stern | .............. | F16B 2/08 24/453 |
| 5,598,994 A * | 2/1997 | Olewinski | .......... | F16B 37/0842 248/73 |
| 5,598,995 A * | 2/1997 | Meuth | .............. | E21B 17/1035 248/74.3 |
| 5,613,655 A * | 3/1997 | Marion | .............. | F16L 3/2235 24/339 |
| 5,653,411 A * | 8/1997 | Picco | .............. | F16L 3/2235 248/74.1 |
| 5,669,590 A * | 9/1997 | Przewodek | .............. | F16L 3/221 248/68.1 |
| 5,675,128 A * | 10/1997 | Simon | .............. | F16L 3/1033 174/135 |
| 5,730,399 A * | 3/1998 | Baginski | .............. | H02G 3/263 24/16 PB |

(56) References Cited

U.S. PATENT DOCUMENTS

| | | | | |
|---|---|---|---|---|
| 5,785,285 A * | 7/1998 | Gordon | F16L 3/13 | 248/68.1 |
| 5,794,897 A * | 8/1998 | Jobin | H02G 7/053 | 24/459 |
| 5,815,894 A * | 10/1998 | Soriano | A01K 97/08 | 24/510 |
| 5,820,048 A * | 10/1998 | Shereyk | F16L 3/1215 | 248/68.1 |
| 5,848,771 A * | 12/1998 | Hancock-Bogese | F16L 3/233 | 248/74.3 |
| 5,884,367 A * | 3/1999 | Teagno | F16L 3/2332 | 24/16 PB |
| 5,921,510 A * | 7/1999 | Benoit | F16L 3/2334 | 248/71 |
| 5,926,921 A * | 7/1999 | Benoit | B65D 63/1081 | 24/16 PB |
| 5,941,483 A * | 8/1999 | Baginski | F16L 3/237 | 248/68.1 |
| 5,957,352 A * | 9/1999 | Gares | B25H 3/04 | 224/401 |
| 5,961,081 A * | 10/1999 | Rinderer | H02G 3/32 | 248/305 |
| 5,966,781 A * | 10/1999 | Geiger | F16L 3/137 | 24/16 PB |
| 5,984,242 A * | 11/1999 | Meyer | B29C 45/0017 | 248/544 |
| 6,079,673 A * | 6/2000 | Cox | F16L 3/1041 | 174/40 R |
| 6,105,908 A * | 8/2000 | Kraus | F16L 3/137 | 24/16 PB |
| 6,119,314 A * | 9/2000 | Freed | B65D 63/1063 | 24/16 PB |
| 6,129,317 A * | 10/2000 | Rodrigues | F16L 3/137 | 248/49 |
| 6,164,605 A * | 12/2000 | Drake | B60T 17/046 | 24/16 PB |
| 6,196,751 B1 * | 3/2001 | Khokhar | F16D 1/08 | 403/3 |
| 6,206,331 B1 * | 3/2001 | Keith | B60R 16/0215 | 248/73 |
| 6,209,827 B1 * | 4/2001 | Kawai | F16B 21/02 | 248/49 |
| 6,253,421 B1 * | 7/2001 | Kraus | B65D 63/1063 | 24/16 PB |
| 6,315,250 B1 * | 11/2001 | Meyer | B29C 45/0017 | 248/544 |
| 6,354,545 B1 * | 3/2002 | Liao | B60T 7/104 | 224/459 |
| 6,355,887 B1 * | 3/2002 | Gretz | F16L 3/233 | 174/135 |
| 6,382,570 B1 * | 5/2002 | Simpson | F16L 3/2334 | 24/16 PB |
| 6,484,366 B1 * | 11/2002 | Deschenes | B65D 63/1063 | 24/16 PB |
| 6,513,766 B1 * | 2/2003 | Gretz | F16L 3/133 | 24/16 PB |
| 6,533,226 B2 * | 3/2003 | Geiger | F16L 3/233 | 248/68.1 |
| 6,550,723 B2 * | 4/2003 | Fraley, II | F16L 3/233 | 248/70 |
| 6,560,822 B2 * | 5/2003 | Caveney | B65D 63/1036 | 24/16 PB |
| 6,669,150 B2 * | 12/2003 | Benoit | F16B 21/084 | 248/71 |
| 6,685,144 B1 * | 2/2004 | Wochnick | F16L 3/085 | 248/60 |
| 6,718,597 B2 * | 4/2004 | Geiger | B65D 63/1072 | 24/16 PB |
| 6,749,157 B2 * | 6/2004 | Takeuchi | F16B 21/084 | 24/16 PB |
| 6,764,050 B2 * | 7/2004 | Takenaga | B60R 16/0215 | 24/16 PB |
| 6,773,036 B1 * | 8/2004 | King | F16L 47/345 | 24/20 TT |
| 6,809,257 B2 * | 10/2004 | Shibuya | B60R 16/0215 | 174/481 |
| 6,843,456 B1 * | 1/2005 | Hajianpour | B62J 11/00 | 224/414 |
| 6,923,407 B2 * | 8/2005 | Takeuchi | F16B 21/02 | 24/458 |
| 7,055,784 B2 * | 6/2006 | Stigler | B60R 16/0215 | 24/16 PB |
| 7,114,686 B2 * | 10/2006 | Andrigo | F16B 2/10 | 248/71 |
| 7,143,480 B2 * | 12/2006 | Igarashi | B60R 16/0215 | 24/16 PB |
| 7,175,138 B2 * | 2/2007 | Low | H02G 3/32 | 248/68.1 |
| 7,178,203 B2 * | 2/2007 | Pearson | F16L 3/137 | 24/16 PB |
| 7,207,529 B2 * | 4/2007 | Rosemann | F16L 3/23 | 248/71 |
| 7,223,256 B2 * | 5/2007 | Bierman | A61M 25/02 | 604/174 |
| 7,284,302 B2 * | 10/2007 | Lares | F16L 33/035 | 24/16 PB |
| 7,294,789 B1 * | 11/2007 | Watthanasintham | | B60R 16/0215 174/135 |
| 7,297,874 B2 * | 11/2007 | Yasuda | B60R 16/0215 | 174/135 |
| 7,306,755 B2 * | 12/2007 | Morello | F16L 3/13 | 264/219 |
| 7,316,375 B2 * | 1/2008 | Wakabayashi | B60R 16/0215 | 24/16 PB |
| 7,380,758 B2 * | 6/2008 | Hauser | F16L 3/2235 | 248/68.1 |
| 7,387,282 B2 * | 6/2008 | Kovac | B60R 16/0215 | 248/55 |
| 7,392,967 B2 * | 7/2008 | Liaw | F21V 21/088 | 248/218.4 |
| 7,404,548 B2 * | 7/2008 | Kwilosz | B60R 16/0215 | 248/71 |
| 7,429,020 B2 * | 9/2008 | Huebner | F16L 3/133 | 24/16 PB |
| 7,559,511 B2 * | 7/2009 | Yon | F16L 3/2235 | 174/135 |
| 7,614,593 B2 * | 11/2009 | McClure | E21B 17/1035 | 248/229.14 |
| 7,661,631 B2 * | 2/2010 | Ibaraki | F16L 3/1075 | 248/73 |
| 7,661,633 B2 * | 2/2010 | Igarashi | F16L 3/2334 | 248/74.3 |
| 7,753,320 B2 * | 7/2010 | Geiger | F16B 21/084 | 248/71 |
| 7,762,503 B2 * | 7/2010 | Franks | F16L 3/233 | 24/16 PB |
| 7,775,484 B2 * | 8/2010 | Gunzburger | B60R 16/0215 | 248/74.3 |
| 7,784,745 B2 * | 8/2010 | Dodge | F16L 3/1075 | 248/73 |
| 7,793,895 B2 * | 9/2010 | Franks | F16B 19/00 | 24/16 PB |
| 7,819,365 B2 * | 10/2010 | Elsner | B60R 16/0215 | 248/74.3 |
| 7,861,981 B2 | 1/2011 | Olver | | |
| 8,020,810 B2 * | 9/2011 | Dietrich | H02G 3/32 | 248/63 |
| 8,020,811 B2 * | 9/2011 | Nelson | F16L 3/2235 | 174/68.1 |
| 8,028,962 B2 * | 10/2011 | Geiger | F16L 3/2332 | 174/656 |
| 8,083,432 B2 * | 12/2011 | Limpert | F16L 3/237 | 403/389 |
| 8,152,121 B2 * | 4/2012 | Thomas | F25B 41/31 | 248/229.1 |
| 8,157,222 B1 * | 4/2012 | Shirey | H02G 3/32 | 248/74.1 |

(56) References Cited

U.S. PATENT DOCUMENTS

| | | | | |
|---|---|---|---|---|
| 8,231,147 B2* | 7/2012 | Link | | F16L 33/035 285/420 |
| 8,286,924 B2* | 10/2012 | Sano | | F16B 21/088 248/74.3 |
| 8,342,468 B1* | 1/2013 | Strickland | | A47G 23/0225 248/311.2 |
| 8,579,239 B2* | 11/2013 | Lothamer | | B60R 16/0215 248/69 |
| 8,757,562 B2* | 6/2014 | Fujiwara | | F16B 2/24 248/74.2 |
| 8,894,022 B2* | 11/2014 | Chirpich | | F16L 3/137 248/74.3 |
| 8,968,343 B2* | 3/2015 | Funamura | | A61B 17/0485 606/148 |
| 8,991,774 B2* | 3/2015 | Hajduch | | F16B 5/0685 248/73 |
| 9,022,438 B2* | 5/2015 | Mori | | E05B 79/20 292/336.3 |
| 9,068,674 B1* | 6/2015 | Mangone, Jr. | | F16L 3/2332 |
| 9,270,100 B2* | 2/2016 | Kuhm | | H01R 13/5804 |
| 9,548,598 B2* | 1/2017 | Tally | | H02G 3/32 |
| 9,718,591 B2* | 8/2017 | Lu | | B65D 63/1027 |
| 9,939,086 B1* | 4/2018 | Mangone, Jr. | | F16L 3/2336 |
| 10,029,625 B1* | 7/2018 | Mejia Perez | | B60J 5/0468 |
| 10,368,671 B2* | 8/2019 | Berg | | A45C 13/28 |
| 2002/0088905 A1 | 7/2002 | Hansen | | |
| 2002/0104931 A1* | 8/2002 | Mascadri | | H02G 3/30 248/74.3 |
| 2003/0222184 A1* | 12/2003 | Geiger | | F16L 3/137 248/65 |
| 2004/0182973 A1 | 9/2004 | Kawai | | |
| 2004/0188571 A1 | 9/2004 | Stigler | | |
| 2005/0017133 A1* | 1/2005 | Wochnick | | F16L 3/085 248/74.1 |
| 2005/0079756 A1* | 4/2005 | Kawai | | B60R 16/0215 439/460 |
| 2006/0130286 A1* | 6/2006 | Igarashi | | F16L 3/2334 24/17 A |
| 2007/0007398 A1 | 1/2007 | Franks | | |
| 2007/0023586 A1* | 2/2007 | Geiger | | B60R 16/0215 248/71 |
| 2007/0215757 A1* | 9/2007 | Yuta | | F16L 55/035 248/68.1 |
| 2008/0164383 A1* | 7/2008 | Gunzburger | | F16L 3/2334 248/74.3 |
| 2008/0250609 A1* | 10/2008 | Franks | | H02G 3/30 24/16 R |
| 2009/0113675 A1* | 5/2009 | Saltenberger | | B65D 63/1072 24/16 PB |
| 2009/0115226 A1* | 5/2009 | Shallcross | | B60R 16/0215 296/210 |
| 2009/0211061 A1* | 8/2009 | Cianciolo | | B65D 63/1072 24/16 PB |
| 2009/0236486 A1* | 9/2009 | Matsuno | | B60R 16/0215 248/316.7 |
| 2009/0266945 A1* | 10/2009 | Dietrich | | F16L 3/1025 248/74.2 |
| 2010/0001135 A1* | 1/2010 | Zeuner | | H02G 3/0412 244/129.2 |
| 2010/0242829 A1* | 9/2010 | Macey | | G09F 19/22 116/201 |
| 2010/0243824 A1* | 9/2010 | Desai | | F16L 3/127 248/65 |
| 2010/0294896 A1* | 11/2010 | Sayilgan | | B64C 1/406 248/73 |
| 2011/0068234 A1* | 3/2011 | Schaety | | F16L 3/233 248/68.1 |
| 2011/0163533 A1* | 7/2011 | Snyder | | F16L 33/035 285/88 |
| 2011/0239412 A1* | 10/2011 | Sano | | F16B 21/086 24/16 R |
| 2012/0217354 A1* | 8/2012 | Walraven | | F16L 3/1025 248/74.1 |
| 2014/0151514 A1* | 6/2014 | Asai | | H02G 3/34 248/74.1 |
| 2014/0259620 A1* | 9/2014 | Hicks | | F16L 3/223 29/525.01 |
| 2014/0299723 A1* | 10/2014 | Kato | | F16L 3/1222 248/74.4 |
| 2014/0367539 A1* | 12/2014 | Ogasawara | | F16L 3/137 248/205.1 |
| 2015/0122957 A1* | 5/2015 | Michiels | | F16L 3/13 248/74.2 |
| 2016/0001945 A1* | 1/2016 | Foreman | | F16L 3/222 29/525.03 |
| 2016/0254656 A1* | 9/2016 | Feige | | H01B 11/007 248/61 |
| 2016/0280433 A1* | 9/2016 | Montejo | | B65D 63/16 |
| 2017/0023155 A1* | 1/2017 | Lu | | B65D 63/1027 |
| 2018/0111645 A1* | 4/2018 | Arima | | B62D 25/145 |
| 2018/0274699 A1* | 9/2018 | Ratzlaff | | H02G 3/32 |
| 2020/0032566 A1* | 1/2020 | Fukumoto | | F16L 3/223 |

FOREIGN PATENT DOCUMENTS

| | | |
|---|---|---|
| EP | 1619081 A1 | 1/2006 |
| GB | 2404420 A | 2/2005 |
| JP | 2003028111 A | 1/2003 |
| WO | 9002284 A1 | 3/1990 |
| WO | 03001069 A1 | 1/2003 |

OTHER PUBLICATIONS

International Search Report and Written Opinion of the International Searching Authority from corresponding PCT Application No. PCT/US2010/038468, dated Sep. 14, 2010 (11 pages).

* cited by examiner

SELF-CENTERING CABLE STRAP

CROSS-REFERENCE TO RELATED APPLICATIONS

The present application is a continuation of U.S. patent Ser. No. 13/382,785, filed Jan. 6, 2012, which is a national phase of PCT/US2010/038468, filed Jun. 14, 2010, which claims the benefits of U.S. Provisional Application Ser. No. 61/223,451, filed Jul. 7, 2009, all of which are hereby incorporated by reference in their entireties.

FIELD OF THE INVENTION

The present invention relates generally to straps for encircling and securing objects and, more particularly to a cinch strap having a base or anchor and a strap for holding cables, wires or tubes.

BACKGROUND OF THE INVENTION

Cable straps are used to secure together items such as bundles of wires or cables, or to secure wires or cables to objects. For example, when two or more wires are run along a common path, to ensure an orderly appearance cinch straps or cable straps are used to bind the wires or cables together. Similar straps can be used to secure one or several wires or cables to a frame, pipe or other object fixed in position relative to the wires. In this way, the wires can be held in an inconspicuous location, and can be protected from dangerous entanglements or other damage.

The general design of a known cable strap for mounting cables, wires, etc. in structures such as motor vehicles, appliances and the like includes some type of anchoring feature, such as deflectable legs for securing the cinch strap assembly in an anchoring hole of a component in the structure, a clamping structure to lock the cable strap in a selected position, etc. A pedestal having an outer bed to support the cables or wires being held extends from the top of the anchoring feature. A strap connected to the pedestal encircles the cables or wires, and a distal end of the strap is passed through a locking aperture in the pedestal below the bed. Protrusions on the strap engage cooperating features in the locking aperture to inhibit withdrawal of the strap from the locking aperture. In this way, the strap cinches the cable or wires against the pedestal bed.

A recognized phenomenon in the use of such cable straps is that a large cable or bundle of cables frequently will stabilize on the pedestal bed in an off-centered orientation. As the strap encircling the cable or bundle of cables is pulled taut and secured in the locking aperture, the strap assumes a departing angle from the pedestal closer and closer to ninety degrees, thus urging the cable or bundle of cables in a direction away from the attached end of the cable. This moves the center of the cable or bundle of cables away from the centerline of the pedestal and away from the centerline of the anchoring feature and anchoring hole. This can cause the anchoring feature to twist or bend relative to the anchoring hole, potentially causing wear and/or dislodgement.

What is needed and would provide advantages is a self-centering cable strap that promotes alignment of a cable or bundle of cables with the centerline of the anchoring feature of the cable strap.

SUMMARY OF THE INVENTION

The present self-centering cable strap includes fingers extending away from the bed on the opposite side form the anchored end of the strap to hold a cable or bundle of cables in a more centered orientation on the bed.

In one aspect of one form of a self-centering cable strap, there is provided a pedestal, a bed for receiving an item held by the self-centering strap and a cinch strap having a proximal end secured to the pedestal. A strap-receiving aperture is provided in the pedestal. An abutment finger extends away from the bed from a side of the pedestal opposite from the proximal end of the strap. The finger extends outwardly of a plane defined by a surface of the bed.

In another aspect of a form of a self-centering cable strap a main body defines a bed outer surface; a cinch strap is connected to the main body at a fixed proximal end of the cinch strap and selectively securable to the main body along a length of the cinch strap including a distal end; and an abutment extends laterally and axially from the bed outer surface along a side of the bed opposite the fixed proximal end of the cinch strap.

In still another aspect of a form of a self-centering cable strap a body includes a mounting feature at one end thereof and a bed having an outer surface at an opposite end thereof, the outer surface configured for engaging an item held there against. A strap receiving aperture is defined in the body between the mounting feature and the outer surface. A cinch strap has a proximal end fixedly connected to the body and has and a distal end. The cinch strap is elongated and flexible for forming a loop with the distal end inserted into the strap receiving aperture. An abutment finger extends away from the bed laterally and axially from the outer surface on an opposite side of the bed from the proximal end connected to the body.

An advantage of a self-centering cable strap in at least one form is that a centered and aligned assembly is provided for the cable strap anchoring feature in an anchoring hole and a cable or bundle of cables held by the self-centering strap.

Another advantage of a self-centering cable strap in at least one form is that a clamp requires consistent and controllable closing force for locking.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 1:
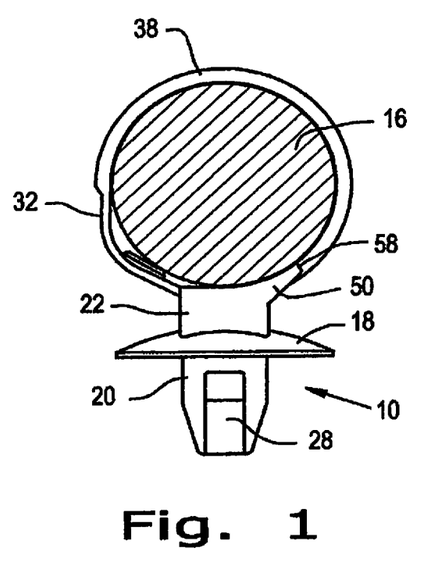
FIG. 1 is an elevational view of a self-centering cable strap holding a cable shown in cross-section.
Figure 2:
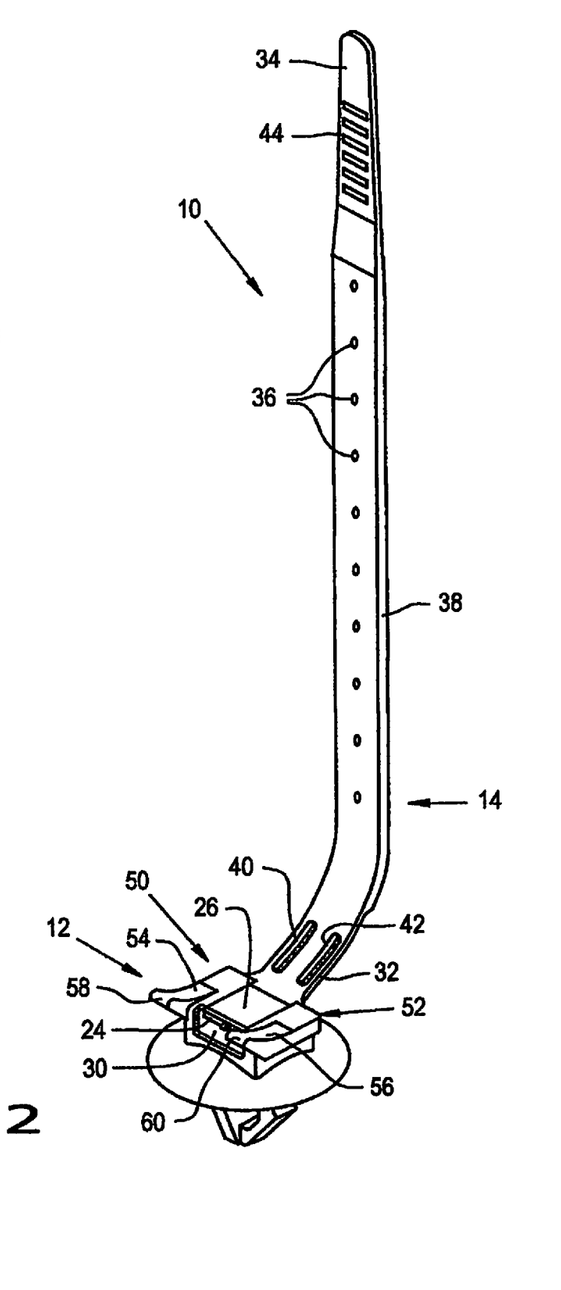
FIG. 2 is a perspective view of the self-centering cable strap shown in FIG. 1.
Figure 3:
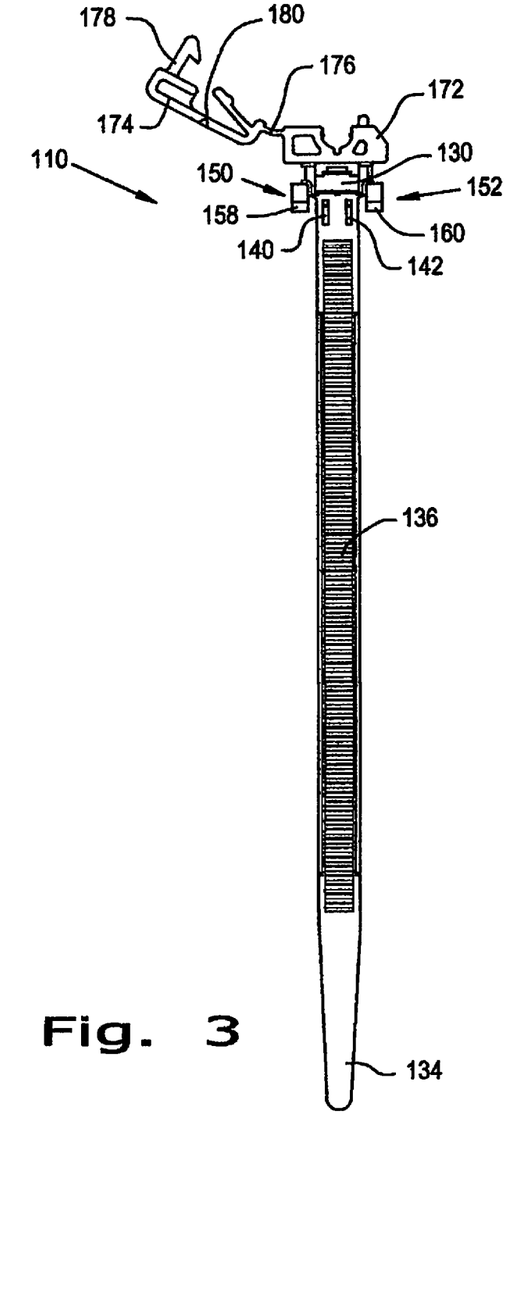
FIG. 3 is a plan view of another embodiment of a self-centering cable strap.
Figure 4:
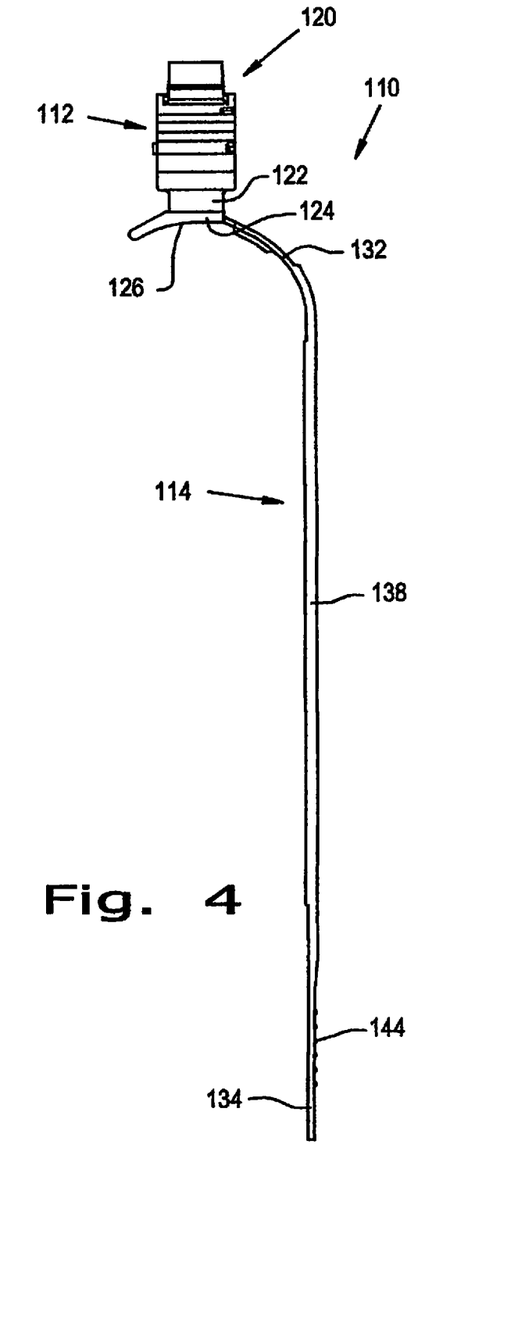
FIG. 4 is a side view of the self-centering cable strap shown in FIG. 3.
Figure 5:
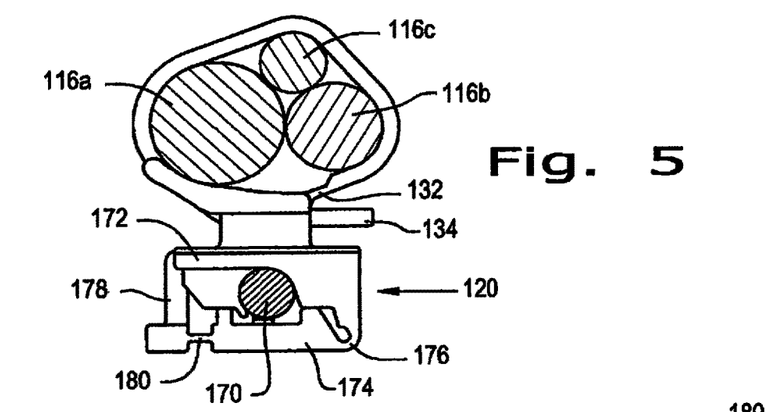
FIG. 5 an elevational view of the self-centering cable strap shown in FIGS. 3 and 4, illustrated holding a bundle of cables.

Referring now to the drawings more specifically and to FIGS. 1 and 2 in particular, a self-centering cable strap 10 is shown. Self-centering cable strap 10 includes a main body 12 and a cinch strap 14 extending therefrom for holding an item 16 such as a cable 16. It should be understood that, although self-centering cable strap 10 is shown holding a single cable 16, self-centering cable strap 10 can hold a plurality of cables 16 of the same size or of different sizes, and can hold wires, tubes, hoses or items other than cable 16 shown. The reference to cable or cables is for purposes of illustration and not limitation.

Self-centering cable strap 10, including main body 12 and cinch strap 14 can be made as a monolithic structure of injection molded plastic or the like.

Main body 12 includes a skirt 18 disposed between a mounting feature 20 at one end and a pedestal 22 at the opposite end. Pedestal 22 has a bed 24 with an outer surface 26 for engaging an item or items such as cable 16 cinched there against by cinch strap 14. Mounting feature 20 can be a pair of deflectable legs 28 for securing self-centering cinch strap 10 in a mounting hole (not shown) of a structure, in known fashion. Other types of mounting features 20 also can be used, including various posts, clamps and the like, as those skilled in the art will understand readily.

Pedestal 22 defines a cinch strap receiving aperture 30 beneath bed 24 outer surface 26. Aperture 30 receives and retains a distal portion of cinch-strap 14 inserted therethrough.

Cinch strap 14 includes a proximal end 32 connected to pedestal 22 and a distal end 34. Cinch strap 14 is an elongated body of pliable, flexible material, and is of sufficient length such that cinch strap 14 can be wrapped around the item or items such as cable 16 held against bed 24, to form a loop over bed 24 with distal end 34 inserted in and selectively securable to strap receiving aperture 30. Cinch strap 14 can include a series of bumps 36 or other structures, such as, for example, knobs, protrusions, transverse ridges, holes and the like on either or both sides of cinch strap 14 as locking features that cooperate with complementary locking features (not shown) within strap receiving aperture 30 to inhibit withdrawal of cinch strap 14 from strap receiving aperture 30. As those skilled in the art will readily understand, such cooperating locking features on cinch strap 14 and in strap receiving aperture 30 can be directionally operational to facilitate easy insertion of cinch strap 14 in strap receiving aperture 30 and tightening of cinch strap 14 against item or items to 16 while inhibiting movement of cinch strap 14 in the reverse direction for withdrawal of cinch strap 14 from strap receiving aperture 30.

Cinch strap proximal end 32 can be thinner than a central segment 38 of cinch strap 14 to promote flexibility and bending of proximal end 32 away from the attachment to pedestal 22. One or more elongated bumper 40, 42 can be provided on the inner surface of proximal end 32 to engage against the item or items 16 being held. In the exemplary embodiment shown, two elongated bumpers 40, 42 are shown, although more or fewer bumpers 40, 42 also can be used. Distal end 34 also can be thinner than central segment 38 to facilitate bending and orientation for insertion into strap receiving aperture 30. Gripping ridges 44 can be provided on one or both primary surfaces of distal end 34 to facilitate grasping and pulling as a cinch strap 14 is pulled through strap receiving aperture 30 and snugged against the item or items 16 being held.

First and second abutment fingers 50, 52 extend away from bed 24 on a side thereof opposite from the attachment of strap proximal end 32. Abutment fingers 50, 52 are curved extensions from bed 24 that extend laterally from bed 24 and away from outer surface 26 in a direction away from pedestal 22. Accordingly, abutment fingers 50, 52 have abutment finger proximal ends 54, 56 connected to pedestal 22 and/or bed 24 and abutment finger distal ends 58, 60 spaced from bed 24 outer surface 26 both laterally and axially relative to the center line of self-centering cable strap 10. In the vertical orientation shown, abutment finger distal ends 58, 60 are above the plane of outer surface 26 of bed 24. Abutment fingers 50, 52 serve as retention fingers for positioning item or items 16 whereby the item or items 16 can not roll easily over or beyond abutment finger distal ends 58, 60. The length and/or angular orientation of each abutment finger 50, 52 can be selected depending on the size of the item or items 16 to be held. Item or items 16 of smaller diameter may be associated with shorter abutment fingers 50, 52 rising more abruptly, while wide diameter item or items 16 can be held more securely with longer abutment fingers 50, 52 rising more gradually.

As seen in FIG. 1, bed 24 and abutment fingers 50, 52 define a cradle for holding item or items 16. As cinch strap 14 is tightened against item or items 16 the item or items 16 are urged against abutment fingers 50, 52 but do not roll there beyond. Accordingly, the item or items 16 are centered on bed 24 in substantial center line alignment with main body 12.

A second embodiment of a self-centering cable strap 110 is shown in FIGS. 3-7. Self-centering cable strap 110 includes a main body 112 and a cinch strap 114 extending therefrom for holding an item or items 116 such as cables 116 a-c. It should be understood that, although self-centering cable strap 110 is shown holding three cables 116a, 116b and 116c, self-centering cable strap 110 can hold more or fewer items 116 of the same size or of different sizes, and can hold wires, tubes, hoses or items other than cables 116a-c shown. Main body 112 and cinch strap 114 are similar to main body 12 and a cinch strap 14 described previously herein with respect to self-centering cable strap 10, except for the features to be described subsequently herein relating to a mounting feature 120 of self-centering cable strap 110. Accordingly, a pedestal 122, a bed 124 having an outer surface 126 are provided similar to mounting pedestal 22, bed 24 and outer surface 26 described previously. A strap receiving aperture 130 is similar to strap receiving aperture 30. Cinch strap 114 has a strap proximal end 132 and a strap distal end 134 with locking features 136, a cinch strap central segment 138 bumpers 140, 142 and gripping ridges 144 similar to strap proximal end 32, strap distal end 34, central segment 38, bumpers 40, 42 and gripping ridges 44 described previously herein with respect to self-centering cable strap 10. Abutment fingers 150, 152 similar to abutment fingers 50, 52 have abutment finger distal ends 158, 160

Figures 6, 7:
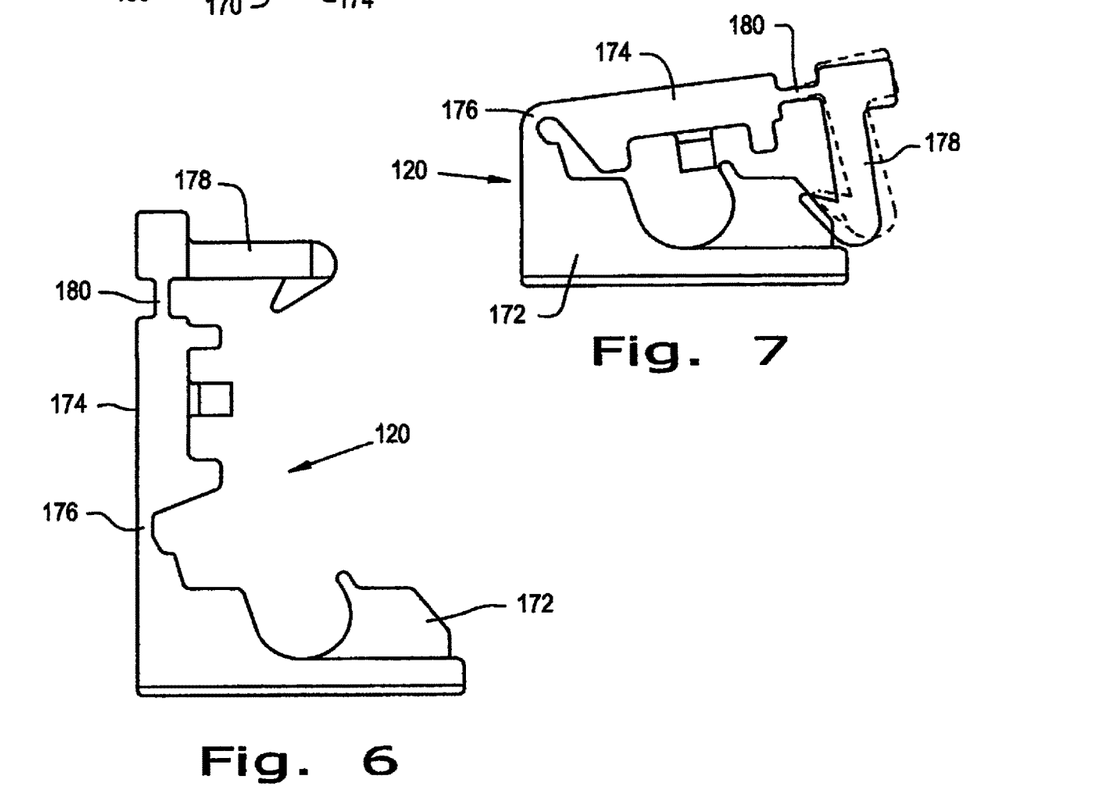
FIG. 6 is a side view of the anchoring feature of the self-centering cable strap shown in FIGS. 3-5.
FIG. 7 is a side view of the anchoring feature of the self-centering cable strap shown in FIGS. 3-6, illustrating the anchoring feature in a partially closed condition.

Mounting feature 120 is a clamp-like device for capturing a structure 170 which may be a rod, pipe, hose, structural member or other body for holding self-centering cable strap 110. Mounting feature 120 includes a base 172 and a cover 174 connected one to another by a hinge 176. Hinge 176 is a thinned, flexible region of material interconnecting base 172 and cover 174, allowing relative rotation and movement between base 172 and cover 174 between closed and opened conditions shown in FIGS. 5 and 6, respectively. An outer edge of cover 174 opposite hinge 176 defines a latch 178 for engaging base 172 and holding the relative positions of base 172 and cover 174 in the closed condition. To provide a consistent and controlled required latching force of latch 178 to base 172, a flexible spring connection 180 is defined between latch 178 and cover 174. Accordingly, deflection in cover 174 or deflection in latch 178 is not required to engage latch 178 with base 172. Instead, the force required for latching is determined and controlled by the deflection of spring connection 180. As shown in FIG. 7, latch 178 can be deflected slightly, as indicated by the dashed outline of latch 178, through the flexure of spring connection 180. The force required to engage latch 178 with base 172 is determined by the stiffness of spring connection 180, with can be increased or decreased in many ways, including by varying the thickness and breadth of spring connection 180.

In the exemplary embodiments shown, self-centering cable straps 10 and 110 include mounting features 20, 120 centered or aligned with pedestals 22, 122 which are then aligned axially with outer surfaces 26, 126, respectively. However, as those skilled in the art will readily understand, in some cable strap embodiments the mounting features are intentional offset by a specified amount in relation to the pedestals and beds thereof. The self-centering features described herein, including the use of appropriate abutment fingers such as abutment fingers 50, 52, 150, 152 described herein, can be used advantageously also with cable strap embodiments having mounting features offset by design in relation to the pedestals and beds thereof. The self-centering feature which keeps the cables, wires, tubes and the like centered to the pedestal and bed will also help maintain the desired offset relationship with the mounting feature, and the desired positioning and attachment within the overall assembly. For example, in some assemblies a hole, tube or other structural feature to which the mounting feature of the cable strap can be attached is not and cannot be centered or aligned with the desired path for routing the cables, wires, tubes and the like being held by the cable strap. In such situations, a cable strap having a designed offset between the cable strap mounting feature and the pedestal and bed for retaining the cables, tubes or wires is used. Facilitating proper alignment of the cables, tubes or wires on the pedestal and bed facilitates the desired and designed overall relationship of the components, and the desired positioning of the cable strap in the assembly. Accordingly, the exemplary illustrations having mounting features aligned with the beds is not limiting on the use or application of the self-centering features disclosed herein, and is not intended to be limiting on the claims to follow.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A self-centering cable strap, comprising:
a main body including a pedestal having a bed with an outer surface that is configured to engage one or more items, wherein the pedestal defines a cinch strap receiving aperture beneath the outer surface of the bed;
a first abutment finger extending away from the bed,
a second abutment finger extending away from the bed,
wherein the bed, the first abutment finger, and the second abutment finger define a cradle for holding the one or more items;
a cinch strap extending from the main body, wherein the cinch strap is configured to be tightened against the one or more items to urge the one or more items against the first abutment finger and the second abutment finger; and
a mounting feature connected to the main body, wherein the mounting feature provides a clamp-like device for capturing a structure, wherein the mounting feature comprises a base connected to a cover by a hinge, wherein the mounting feature is configured to move between a closed position and an open position, wherein an outer edge of the cover opposite from the hinge defines a latch for engaging the base and holding the base and cover together in the closed position, wherein the mounting feature further comprises a flexible spring connection between the latch and the cover, and wherein the cover includes a first planar surface that extends axially from the hinge to the flexible spring connection along a first plane and the latch includes a second planar surface that extends along a second plane perpendicular to the first plane,
wherein the outer surface includes a third planar surface, the cover further includes a fourth planar surface, and the flexible spring connection includes a fifth planar surface and a sixth planar surface, the fifth and sixth planar surfaces defining a first distance therebetween,
wherein, when the mounting feature is in the closed position, the first, fourth, fifth, and sixth planar surfaces are parallel to the third planar surface, and
wherein the first and the fourth planar surfaces of the cover define a second distance therebetween, the first distance being less than the second distance.

2. A self-centering cable strap, comprising:
a main body including a pedestal having a bed with an outer surface and a cinch strap receiving aperture beneath the outer surface of the bed;
a cinch strap having a proximal end secured to a first side of the pedestal;
a first abutment finger having an upper surface against which an item is urged, wherein the upper surface extends between a proximal end and a distal end, wherein the proximal end is connected to the bed and the distal end extends away from and beyond a second side of the pedestal opposite from the proximal end of the strap, wherein the upper surface of the first abutment finger is adjacent to and vertically elevated relative to the outer surface of the bed; and
a mounting feature connected to the main body, the mounting feature including a latch, a base, a cover, and a flexible spring connection between the latch and the cover, wherein the cover includes a first planar surface that extends along a first plane and the latch includes a second planar surface that extends along a second plane perpendicular to the first plane, and wherein the flexible spring connection is substantially parallel to the first plane when the base and the cover are in a closed position and an open position, wherein the outer surface includes a third planar surface, the cover further includes a fourth planar surface, and the flexible spring connection includes a fifth planar surface and a sixth planar surface, the fifth and sixth planar surfaces defining a first distance therebetween, wherein, when the mounting feature is in the closed position, the first, fourth, fifth, and sixth planar surfaces are parallel to the third planar surface, and wherein the first and the fourth planar surfaces of the cover define a second distance therebetween, the first distance being less than the second distance.

3. The self-centering cable strap of claim 2, wherein the self-centering strap further comprises a second abutment finger.

4. The self-centering cable strap of claim 3, wherein the first abutment finger extends away from the bed, and wherein the second abutment finger extends away from the bed.

5. The self-centering cable strap of claim 4, wherein the distal end of the first abutment finger is spaced apart from the outer surface of the bed both laterally and axially relative to a center line of the self-centering cable strap.

6. The self-centering cable strap of claim 5, wherein the second abutment finger comprises a second finger proximal end connected to the pedestal and a second finger distal end spaced apart from the outer surface of the bed both laterally and axially relative to the center line of the self-centering cable strap.

7. The self-centering cable strap of claim 6, wherein the cinch strap further comprises a distal end, wherein the distal end is configured to be inserted into and selectively securable to the cinch strap receiving aperture.

8. The self-centering cable strap of claim 7, wherein the cinch strap further comprises two elongated bumpers on an inner surface proximate to the proximal end of the cinch strap, wherein the two elongated bumpers are configured to engage the one or more items.

9. The self-centering cable strap of claim 8, wherein the cinch strap further comprises gripping ridges proximate to the distal end of the cinch strap, wherein the gripping ridges are configured to facilitate grasping and pulling of the cinch strap.

10. The self-centering cable strap of claim 3, wherein the mounting feature provides a clamp-like device for capturing and engaging a structure.

11. The self-centering cable strap of claim 10, wherein the base is connected to the cover by a hinge, wherein an outer edge of the cover opposite from the hinge defines the latch for engaging the base and holding the base and cover together in the closed position.

12. The self-centering cable strap of claim 2, wherein the first planar surface extends along a substantial length of the cover.

13. The self-centering cable strap of claim 12, wherein the second planar surface extends along a substantial length of the latch.

14. A self-centering cable strap, comprising:
a main body including a pedestal having a bed with an outer surface and a cinch strap receiving aperture beneath the outer surface of the bed;
an abutment finger having a distal end, a proximal end, and an upper surface extending between the distal end and the proximal end, wherein an item is urged against the upper surface;
a cinch strap extending from a first side of the pedestal; and
a mounting feature axially aligned with the pedestal and including a cover, a latch, and a flexible spring connection between the latch and the cover,
wherein the cover includes a first planar surface that extends along a first plane, the latch includes a second planar surface that extends along a second plane perpendicular to the first plane, and the latch includes a third planar surface that is parallel to the second planar surface,
wherein the proximal end is connected to the bed,
wherein the proximal end extends from a second side of the pedestal opposite from the first side of the pedestal,
wherein the abutment finger extends above and outwardly from the outer surface of the bed,
wherein the upper surface of the abutment finger is vertically above the outer surface of the bed between the distal end and the proximal end,
wherein the outer surface includes a fourth planar surface, the cover further includes a fifth planar surface, and the flexible spring connection includes a sixth planar surface and a seventh planar surface, the sixth and seventh planar surfaces defining a first distance therebetween,
wherein, when the mounting feature is in a closed position, the first, fifth, sixth, and seventh planar surfaces are parallel to the fourth planar surface, and
wherein the first and the fifth planar surfaces of the cover define a second distance therebetween, the first distance being less than the second distance.

15. The self-centering cable strap of claim 14, wherein the self-centering cable strap further comprises a second abutment finger.

16. The self-centering cable strap of claim 15, wherein the cinch strap receiving aperture is positioned between the first abutment finger and the second abutment finger.

17. The self-centering cable strap of claim 16, wherein the cinch strap receiving aperture extends between the first side of the pedestal and the second side of the pedestal opposite from the first side of the pedestal.

18. The self-centering cable strap of claim 17, wherein the second abutment finger includes a distal end, a proximal end, and an upper surface extending between the distal end and the proximal end, wherein the item is urged against the upper surface of the second abutment finger and the upper surface of the second abutment finger is vertically above the outer surface of the bed between the distal end of the second abutment finger and the proximal end of the second abutment finger, wherein the proximal end of the second abutment finger extends from the second side of the pedestal opposite from the first side of the pedestal, and wherein the second abutment finger extends above and outwardly from the outer surface of the bed.

19. The self-centering cable strap of claim 18, wherein the mounting feature further comprises a base connected to the cover by a hinge, wherein the mounting feature is configured to move between the closed position and an open position.

* * * * *